Feb. 13, 1962  M. A. MOSKOVITZ  3,021,157
SEAL
Filed Jan. 20, 1958  2 Sheets-Sheet 1
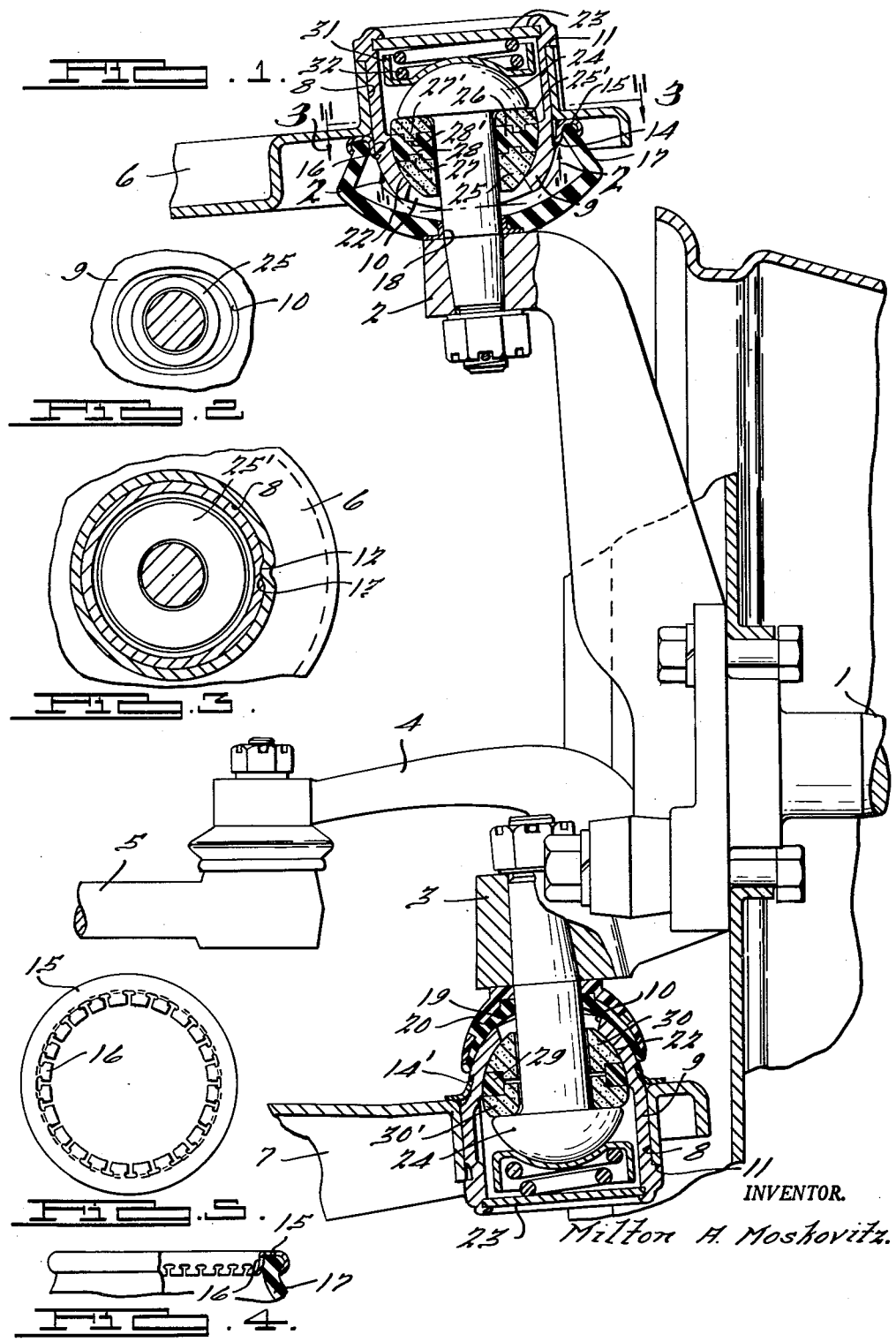
INVENTOR.
Milton A. Moskovitz.

Feb. 13, 1962 M. A. MOSKOVITZ 3,021,157
SEAL
Filed Jan. 20, 1958 2 Sheets-Sheet 2
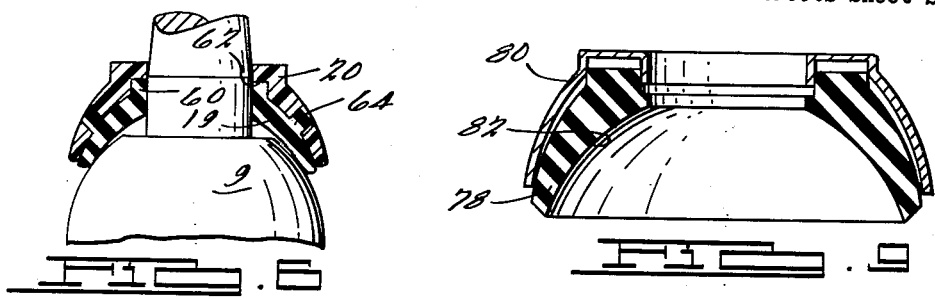
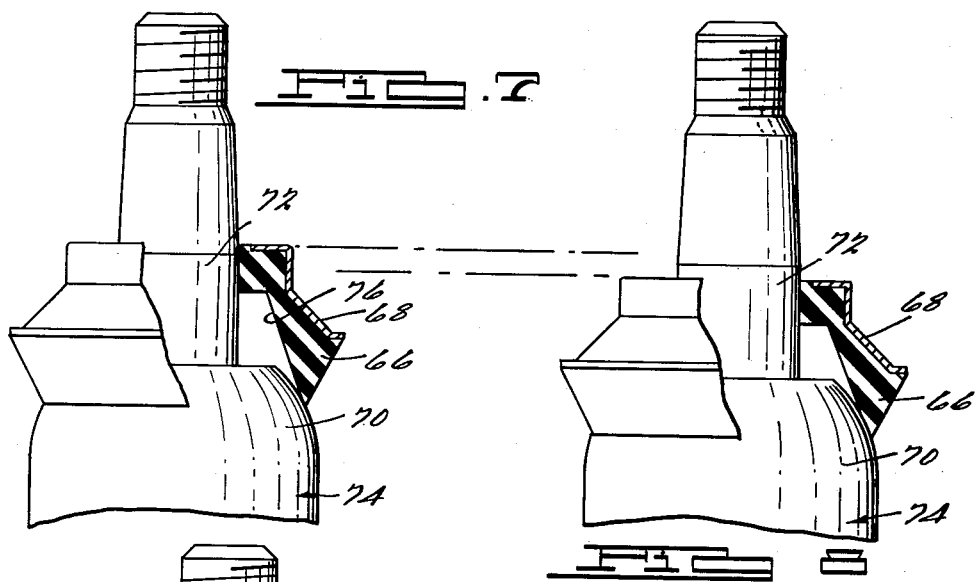
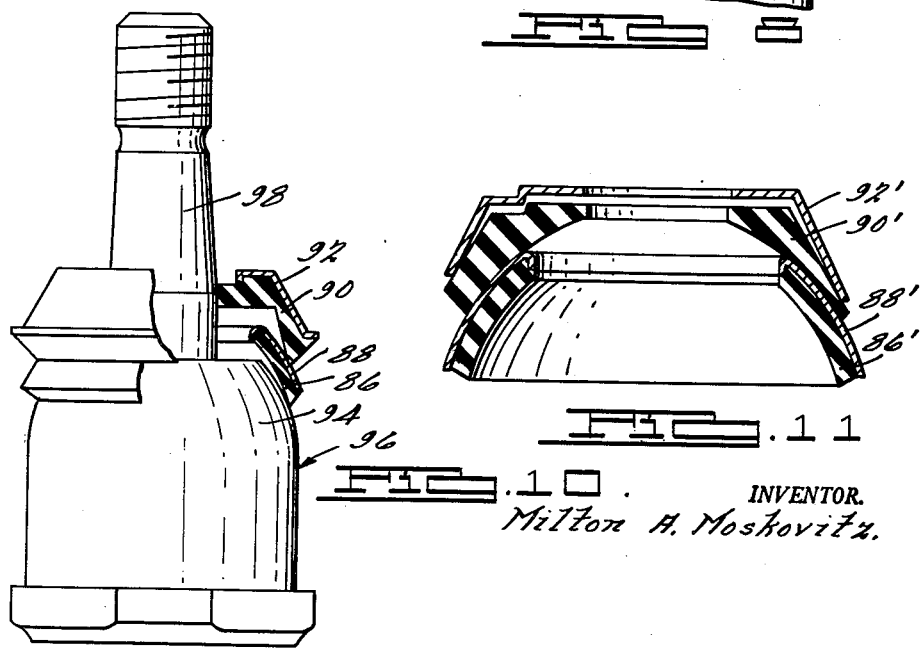
INVENTOR.
Milton A. Moskovitz.

United States Patent Office 3,021,157
Patented Feb. 13, 1962

3,021,157
SEAL
Milton A. Moskovitz, 8135 Antler Drive, Richmond Heights, Mo., assignor of one-half to Harry Frankel, St. Louis, Mo.
Filed Jan. 20, 1958, Ser. No. 709,921
2 Claims. (Cl. 287—90)

This invention relates to automobile constructions and more especially to an improved ball joint assembly for use in independent steerable wheel suspensions.

This application is a continuation-in-part of my application Serial No. 501,157, filed April 13, 1955, and now abandoned.

The invention has among its objects a construction wherein the ball joints may be completely assembled units that are installable or replaceable without requiring disassembling, and wherein the materials that are best suited for specific functions and characteristics are so arranged to insure a long and safe life to the structure.

Other objects of this invention are to improve the effectiveness and to prolong the useful life of dust boots or seals for ball joint units.

A feature of this invention is an improved seal construction in which a highly resilient sealing element is reinforced and protected by an outer resilient element.

Another feature of this invention is the establishment of an improved relationship between a dust seal and a convex housing whereby the application of a force pressing the seal towards the housing will produce a substantial increase in the force and/or area of engagement between the seal and the housing.

Another feature of this invention is an improved multiple-section seal for ball joint units.

Many other objects and advantages of the construction herein shown and described and the uses and advantages mentioned, will be obvious to those skilled in the art to which this invention appertains and as will be apparent from the following specification.

To this end, my invention consists in the novel form, arrangement, construction and combination herein shown and described and as will be more clearly pointed out in the claims hereunto appended.

In the drawings, wherein like reference characters represent like or corresponding parts throughout the views, FIGURE 1 is a fragmentary vertical elevational view of a portion of the front wheel suspension of a motor vehicle, with parts shown in cross-section;

FIGURE 2 is a cross-sectional detail, taken substantially along the line 2—2 of FIG. 1;

FIGURE 3 is a cross-sectional detail, taken substantially along the line 3—3 of FIG. 1;

FIGURE 4 is a cross-sectional detail, partly in elevation, showing the interlock between the spring locking ring and the dust seal end;

FIGURE 5 is a plan view of a locking ring;

FIGURE 6 is a fragmentary view of a portion of the lower ball joint unit of FIG. 1 illustrating the seal in its precompressed position;

FIGURE 7 is a fragmentary view in partial section of a modified form of seal in its free or precompressed position;

FIGURE 8 is a fragmentary view in partial section of the seal of FIG. 7 in its compressed position;

FIGURE 9 is a sectional view of a further form of seal construction illustrated prior to assembly to the ball joint;

FIGURE 10 is a partially cut away view of a double seal construction; and

FIGURE 11 is a sectional view of a modified form of the construction of FIG. 10.

Referring more particularly to the drawings, wherein I have illustrated a preferred embodiment of the invention, there is shown a typical front wheel suspension, as viewed from the rear of the motor-vehicle.

The wheel-supporting spindle 1 has a steering knuckle associated therewith, with upper and lower ends 2 and 3 respectively, and a steering arm 4 for actuating said knuckle, the latter in turn being actuated through pivotal interconnection with a tie-rod end 5 that is controlled by the vehicle operator.

Upper and lower control arms 6 and 7 respectively have annular flanges struck up therefrom to form the eyes 8 transversely through said arms, and said arms are pivotally connected at one end (not shown) to the motor vehicle and are connected at their other ends for universal movement, by ball and socket joints, to the knucke ends.

Each of said joints is in the form of a cartridge or self-contained unit that is completely assembled and which can be inserted into or removed from said eye without disturbing said assembly of the unit. This unit includes a tubular socket member 9 having a bore axially therethrough, one end 10 of this bore being preferably somewhat oval or in the shape of an ellipse as shown most clearly in FIG. 2.

The socket member may have its exterior of such a size and shape as to be positioned through said eye, preferably by forcibly driving said member axially through said eye opening. A radially outwardly projecting flange or shoulder 11 at one end of the socket member abuts the eye flange at the end of driving movement insertion, and thus limits further insertion movement of said socket member into the eye.

Where the end 10 of the opening is non-circular, as shown, it is necessary to insure that the elongated axis of said opening is positioned in a predetermined angular relationship with the arm, and for this purpose guide or pilot means are provided to act between said socket member and the eye flange so that only when said member is at a predetermined single angular relationship with the arm member, can the socket member be driven home in the eye. For example, one of said cooperating members may be provided with a longitudinally extending rib 12 to be slidably received in a longitudinally extending groove 13 in the other member.

In order to lock the socket member against axial withdrawal after it has been driven home to the properly assembled relationship with the arm eye, the socket member may be provided with a second, outwardly extending flange or shoulder 14 spaced longitudinally from the first flange, said shoulder spaced from the adjacent end of the eye after said socket member has been fully driven home, and forming an annular groove about the exterior of the socket wall between said shoulder 14 and the opposed adjacent control arm face.

A locking ring member having a pair of mutually divergent flanges 15 and 16 at an angle to one another, one of said flanges, flange 15, extending radially outwardly and abutting the adjacent face of the control arm and one end of its eye, and the other flange 16 having a plurality of circumferentially spaced resilient fingers extending radially inwardly at their free ends to form an anular opening thereat that is somewhat smaller than the diameter of the groove seat.

Obviously, after the socket member has been driven home through the eye, and while the locking ring is in place, the fingers of the latter will spring or snap past the shoulder 14 into the groove seat, to lock the socket member against accidental withdrawal axially in one direction. To remove the socket member it is first required that said locking ring be removed in any preferred manner from interlocking engagement with the socket member.

The locking ring shown in connection with the upper control arm has the flange 15 reentrantly bent to provide an annular pocket to receive and interlock with a correspondingly-shaped annular end of a dust seal 17 that is made of a rubber-like material, and will act to hold said dust seal fixed at that end.

The dust seal 17 encloses the open end of said socket member and has an aperture at its other end to receive a sleeve 18 of a material such as of nylon, which is slightly expansible but less expansible than the rubber-like material of the seal, interposed thereat to bear against the stud and knuckle, and this sleeve will resist wear much better than the rubber-like material of the seal and therefore increase the period of usefulness of the dust seal.

The other joint may have a like dust seal, or if desired it may differ somewhat and include a rubber-like inner shell 19 to encircle the stud shank and exterior of the socket member, and with an outer shell or sleeve 20 of a different and preferably radially slightly expansible material such as nylon or the like to slidably telescopically receive said inner seal element and fully protect the latter from the elements. The size of the element 20 may be such that it axially displaced from its initial position upon tighening of the stud nut, to shift said element 20 toward said socket member to the full line position shown. This axial shifting of the element 20 will act to contract the inner compressible shell element 19 to cause the latter to tightly engage the exterior surface of the socket member and improve the sealing thereat.

The relationships between the seal elements 19 and 20 and the convex portion of the socket member or casing 9 prior to the assembly of the stud shank and the eye-equipped member 3 (FIG. 1) are illustrated in FIG. 6 of the drawings. In the arrangement there shown, the cup-shaped resilient element 19 is provided with a radially outwardly diminishing wall thickness and has a concave under surface which generally conforms to the curvature of the convex end surface of the casing 9. The shell 20 is similarly shown to have a radially outwardly diminishing wall thickness, but its concave under surface does not conform to the convex end of casing 9. In the illustrated embodiment, the inner surface of element 20 and the convex surface of casing 9 are both shown to be spherical, but in both the partially assembled and the fully assembled positions, the center of curvature of the former is displaced from and above the center of curvature of the latter. The radii of the two surfaces may also vary from one another, and in the illustrated arrangement the radius of the curvature of the inner surface of element 20 is slightly greater than the radius of curvature of the convex surface of casing 9. The requirement, of course, is that the curvatures of the surfaces so differ that the diameter of the lip portion of the seal structure, in its free position, be less than the diameter of the casing section against which the lip portion presses when the seal is fully assembled to the casing so that forces are exerted tending to expand the lip of the seal as the seal is forced over the casing. This may be accomplished by using surfaces of similar configuration (e.g., both spherical) but with their centers of curvature being displaced from one another even in the assembled position, or by forming the surfaces to different shapes.

Since in the seal shown in FIGS. 1 and 6 the inner element 19 is quite resilient relative to the shell 20, it is not critical whether the center of curvature of its convex surface be at or spaced from the center of curvature of the convex surface of casing 9, the forces for pressing the seal lip into proper engagement with the casing being derived primarily from the action of the less resilient shell 20.

It will be observed that the inner element 19 is keyed or locked to the shell 20 both by the provision of an annular tongue 60 on element 19 engaging an annular groove 62 in the under surface of shell 20 (FIG. 6) and by the provision of a plurality of keying protuberances 64 on element 19 engaging corresponding apertures in shell 20. Other bonding means may be employed if desired and, as will be seen, it is not essential in all cases that any such bonding or securing means be provided.

The socket members of the joints are each provided with a concave bearing surface 22 at the small end of the bore and there may be a closure element 23 across its other end. The stud that forms a part of the joint unit is rotatable and tiltable in the socket opening and has an enlarged head 24 within the socket opening, the shank projecting axially outwardly through said opening.

A rotatable and tiltable bearing member is interposed in the socket between the stud and said concave bearing surface and has a convex exterior for complemental bearing relationship with said concave surface. Instead of making this bearing member or bushing of a single material throughout, with a uniform coefficient of friction at all of its bearing area, I have found it desirable to make best use of several available bearing materials to thereby increase the efficiency and longevity of the bearings.

To this end, I so construct said bearing member that various portions of its bearing exterior surface will have friction coefficients that differ from one another, as for instance by making a pair of axially spaced end bearing sections 25—25' of carburized and hardened copper, iron or the like which have the property of being lubricant-impregnable and retaining, but which are substantially inelastic or non-resilient. Intermediate these end sections I interpose the section 26 of a material such as nylon or the like, that is only slightly elastic or expansible under compression and which has a comparatively low coefficient of friction. Initially, said section 26 may be of slightly less diameter than that of the socket bearing surface that it is intended to engage, so that under compression said intermediate bearing section will be radially expanded into bearing engagement with said socket bearing surface.

In order to prolong the effective life of said bearing, the various bearing sections may be rotatable relative to one another. While satisfactory relationships can be established by providing abutting flat face surfaces on the several sections, in the illustrated upper joint the sections are provided with interengaging ribs and grooves, as for example with the ribs 27—27' on the opposed faces of the end sections and annular mating grooves 28—28' on the faces of the intermediate section. Such rib and groove interconnection retains the parts in proper relationship while permitting the adjacent sections to rotate relative to one another, to thereby present fresh bearing areas to the socket bearing surface and to achieve a slower and more uniform wear.

The lower joint shows a slightly different way of interengaging the nylon bearing section 29 with the end sections 30—30'.

By rounding the peripheral edges of the bearing sections, peripheral grooves are formed between adjacent sections in which lubricant may accumulate and communicate with the opposed faces of the sections to reduce rotary friction thereat.

Although nylon is an excellent bearing material and has a low coefficient of friction, it has a tendency to cold-flow under excess loading and to seize or grab in the absence of sufficient lubrication, so that although it is inadvisable to use it alone as the bearing member, yet it performs admirably in associaton with the other material as herein disclosed, and the oil exuded from the bearing surfaces of the oil-impregnated material will always provide a sufficient oil film to prevent such seizure. The sandwiching of the element 26 between the elements 25 and 25' will control the cold-flow of the nylon section.

If it is desired to pre-load the bearings of the joints, yieldably resilient pressure means, such as the plate 31 and spring 32 may be interposed between the socket closure and the head of the stud.

In the seal construction illustrated in FIGS. 7 and 8 of the drawings, the seal 66 is formed of a resilient material such as rubber backed by a less resilient and effectively rigid shell 68 formed, for example, of steel. These elements can, but need not, be bonded together.

The seal 66 and the shell 68 are provided with aligned central apertures which accept and engage the portion 72 of the stud shank, the element 66 sealingly engaging that shank and the metallic element 68 serving both as a reinforcement and as a bearing surface engageable with the eye-equipped member to reduce the friction during rotation of the parts.

The lip of the seal 66 sealingly engages the convex end 70 of the ball joint casing. In the free, unstressed condition of seal 66, as illustrated in FIG. 7, the tip of the lip thereof makes line contact with the curved portion 70 of the casing, the diameter of the lip being greater than the effective cross-sectional diameter of the portion 70 at its uppermost end but being less than the effective cross-sectional diameter of the cylindrical portion 74 of the housing. The remainder of the inner surface 76 of the seal 66 is spaced from the convex surface 70 at this point in the assembly operation. In the illustrated arrangement, the inner surface 76 is primarily conical and lies at an acute angle to the tangent to the surface 70 at the line of engagement. Otherwise stated, the angle between the longitudinal axis of the casing and the tangent to the surface 70 at the line of engagement is greater than the angle between that axis and the inner surface 76 (or the tangent to the inner surface) of the seal 66 at the line of contact. It will, of course, be appreciated that since a major portion of the inner surface 76 does not come into contact with surface 70, its configuration is not critical and it may be curved or may be formed of a plurality of curved or straight sections. It will also be appreciated that the tip of the seal may be provided with a short section having a curvature generally conforming to the curvature of the surface 70 so as to provide, at the initial engagement, area contact. In all cases, the requirement is that the inner surface of the seal above the uppermost point of initial contact be spaced from the surface 70 of the housing.

When the seal is forced upon the casing (as during the placing of the eye-equipped member on the stud shank), the seal 68 is distorted from its free condition to the stressed condition illustrated in FIG. 8. This distends the lip of the seal, forcing it to assume a larger diameter and establishes a substantial force of engagement between the seal and the surface 70 resulting from the resiliency of the material of which the seal 68 is formed. In this fully assembled position, area contact is established between the seal and the casing.

The modification of FIG. 9 illustrates a seal in which the resilient portion 78 is not bonded or otherwise secured to the shell 80. In this arrangement, the inner surface 82 of the portion 78 is or may be conformed to the shape of the convex end of the ball joint casing, but the shell 80 is so formed that the tangent to its under surface near the tip thereof is at an acute angle to the tangent to the under surface 82 at a corresponding point. Therefore, during assembly, the pressing of the shell 80 downwardly toward the ball joint casing results in the establishment of an increasing force of engagement between the lip of the seal 78 and the casing. Shell 80 may flex to a degree in the process, but primarily, the force derives from the compression of the lip of resilient element 78.

The double seal illustrated in FIG. 10 includes a lower seal having a resilient element 86 and a backing member or shell 88 of less resilient (e.g., steel or nylon) material, and an upper seal having resilient member 90 and shell 92. The lower seal is designed to make tip engagement with the convex surface 94 of the ball joint casing 96 and the upper seal is designed to make tip engagement with the shell 88, in both cases, the application of compressive forces during assembly increasing the force and area of the tip engagement. It will be noted that the upper seal is in sealing relationship with the stud shank 98 and will tilt therewith, but the lower seal is spaced from the shank 98 and will not tilt with tilting movements of the shank at least until the angle of tilt is extreme.

The modification of FIG. 11 is presented to illustrate that the upper sealing element 90' can be conformed to the curvature of the shell 88' of the lower seal assembly, with the shell 92' being appropriately formed to develop the increasing force of engagement between the tip of the seal 90' and the shell 88' during assembly. In each case where such a construction is employed, assembly can be facilitated if the shell (92') is not bonded or secured to the resilient seal element (as element 90') so as to permit the shell to move longitudinally of the resilient element during the assembly operation.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a ball and socket joint unit including a socket casing for connection to one body and a stud for connection to a second body to secure those bodies for relative tilting and rotational movements, the casing having an apertured externally convex end through which the stud projects, a seal for enclosing the aperture comprising a pair of seal elements each of which includes a resilient cupped member having a central aperture to accept the stud and a peripheral lip, and a relatively inflexible shell member surrounding and engaging the outer surface of said resilient member to provide rigidity for the same, one of said resilient members of one of said seal elements sealingly engageably receiving the stud shank and also having an inner surface which differs in contour from the opposed contour of said convex end of the casing, the lip of the resilient member of the other seal element engaging said convex end of the casing, the lip of the resilient member of the first of said seal elements engaging the shell member of the other seal element, whereby axial pressure on said first seal element toward said casing forces the lip of said one seal element into intimate engagement with the casing.

2. In a ball and socket unit including a socket casing for connection to one body and a stud for connection in a second body to secure those bodies for relative tilting and rotational movements, the casing having an apertured externally convex end through which the stud projects, a seal for enclosing the aperture comprising a pair of seal elements each of which includes a resilient cupped member having a central aperture to accept the stud and a peripheral lip, and a relatively inflexible shell member surrounding and engaging the outer surface of said resilient member to provide rigidity for the same, the lip of the resilient member of one of said seal elements engaging the externally convex end of the casing, the resilient member of the other one of said seal elements sealingly engageably receiving the stud shank and whose lip engages the shell member of said one seal element, one of said members of said other seal element having an inner surface which differs in contour from the opposed contour of the shell member of said one seal element, whereby axially forcing said other seal element toward said casing forces the lip of said one of said members into intimate engagement with said convex end of said casing.

References Cited in the file of this patent

UNITED STATES PATENTS

| | | |
|---|---|---|
| 2,083,718 | Kull et al. | June 15, 1937 |
| 2,686,070 | Booth | Aug. 10, 1954 |
| 2,752,180 | | |
| 2,823,055 | | |
| | Vogt | June 26, 1956 |
| | Booth | Feb. 11, 1958 |

FOREIGN PATENTS

| | | |
|---|---|---|
| 765,514 | France | Mar. 26, 1934 |
| 1,091,445 | France | Oct. 27, 1954 |